(12) United States Patent  
Christianson

(10) Patent No.: US 8,059,024 B2
(45) Date of Patent: Nov. 15, 2011

(54) INFERENCE OF TURBULENCE HAZARD FROM PROXIMITY TO RADAR TURBULENCE MEASUREMENT

(75) Inventor: Paul Christianson, Seattle, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/641,065

(22) Filed: Dec. 17, 2009

(65) Prior Publication Data

US 2011/0148693 A1    Jun. 23, 2011

(51) Int. Cl.
*G01S 7/04* (2006.01)

(52) U.S. Cl. .................. 342/26 B; 342/179; 342/180
(58) Field of Classification Search ............ 342/26 B
See application file for complete search history.

(56) References Cited

U.S. PATENT DOCUMENTS

| | | | |
|---|---|---|---|
| 5,347,459 A * | 9/1994 | Greenspan et al. ........... 700/255 |
| 7,109,912 B1 | 9/2006 | Paramore et al. | |
| 7,132,974 B1 * | 11/2006 | Christianson ............. 342/26 R |
| 7,161,525 B1 * | 1/2007 | Finley et al. .............. 342/26 R |
| 7,352,317 B1 * | 4/2008 | Finley et al. .............. 342/26 B |
| 7,471,995 B1 * | 12/2008 | Robinson ..................... 701/3 |
| 7,486,220 B1 | 2/2009 | Kronfeld et al. | |
| 7,492,305 B1 * | 2/2009 | Woodell et al. ............. 342/26 B |
| 7,656,343 B1 * | 2/2010 | Hagen et al. ............... 342/26 B |
| 7,696,920 B1 * | 4/2010 | Finley et al. ............... 342/26 B |
| 7,696,921 B1 * | 4/2010 | Finley et al. ............... 342/26 B |
| 7,817,078 B2 * | 10/2010 | Bunch ....................... 342/26 B |
| 2009/0177343 A1 * | 7/2009 | Bunch et al. .................. 701/14 |
| 2010/0019938 A1 * | 1/2010 | Bunch ......................... 340/963 |
| 2010/0073199 A1 * | 3/2010 | Christophe et al. ........... 340/963 |
| 2010/0194628 A1 * | 8/2010 | Christianson et al. ....... 342/26 B |
| 2011/0013016 A1 * | 1/2011 | Tillotson .................... 348/135 |

* cited by examiner

*Primary Examiner* — Thomas Tarcza
*Assistant Examiner* — Matthew M Barker
(74) *Attorney, Agent, or Firm* — Lowe Graham Jones PLLC

(57) ABSTRACT

Systems and methods for conveying turbulence hazards to a flight crew. An exemplary weather radar system includes a three-dimensional buffer, a processor, and a display. The processor receives weather radar reflectivity values, stores the received weather radar reflectivity values into a three-dimensional buffer, generates and stores turbulence values into cells of the three-dimensional buffer based on the stored respective reflectivity values, and generates first display icons for cells that are located within a predefined threshold distance from a cell in the three-dimensional buffer that has been determined to include a turbulence value that is greater than a first threshold value. The display presents the first display icons when associated cells are selected for display from the three-dimensional buffer.

18 Claims, 4 Drawing Sheets

INFERENCE OF TURBULENCE HAZARD FROM PROXIMITY TO RADAR TURBULENCE MEASUREMENT

BACKGROUND OF THE INVENTION

Airborne radar is used to predict where an aircraft might experience excessive turbulence. This information can then be used by pilots to plan routes that avoid the turbulence. The radar can measure the component of turbulence winds only along the direction from the radar to the point in question, which is primarily the horizontal direction. However, aircraft are sensitive to the component of turbulent wind in the vertical direction. High intensities of aircraft-experienced turbulence cannot be expected to always be spatially coincident with high values of radar-measured turbulence.

SUMMARY OF THE INVENTION

The present invention provides systems and methods for conveying turbulence hazards to a flight crew. An exemplary weather radar system includes a three-dimensional buffer, a processor and a display. The processor receives and stores turbulence values into cells of the three-dimensional buffer, and generates first display icons for cells that are within a predefined threshold distance from a cell in the three-dimensional buffer that has been determined to include a turbulence value that is greater than a first threshold value. The display presents the first display icons when associated cells are selected for display from the three-dimensional buffer.

These and other examples of the invention will be described in further detail below.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
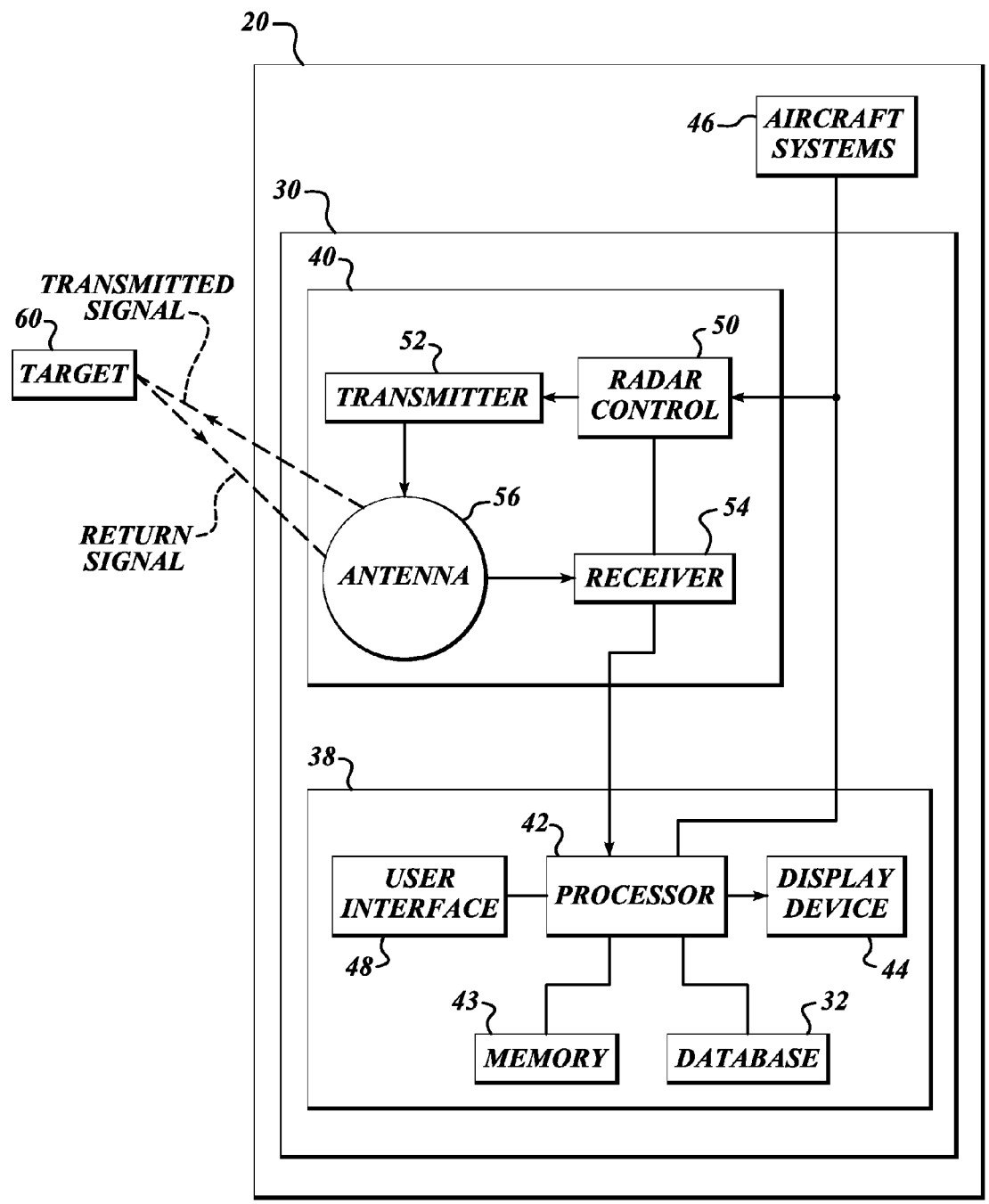
FIG. 1 is a schematic block diagram of a system formed in accordance with an embodiment of the present invention.

FIG. 1 illustrates an exemplary aircraft 20 having a weather display system 30 for providing improved radar returns. The exemplary weather display system 30 includes a weather radar system 40 and a display/interface front-end 38, and receives information from an aircraft system 46. The display/interface front-end 38 includes a display processor 42, memory 43, a display device 44, a user interface 48, and a database 32. An example of the radar system 40 includes a radar controller 50 (coupled to the user interface 48), a transmitter 52, a receiver 54, and an antenna 56. The radar controller 50 controls the transmitter 52 and the receiver 54 for performing the sending and receiving of signals through the antenna 56. The weather radar system 40 and the display/interface front-end 38 are electronically coupled to the aircraft system 46.

Radar relies on a transmission of a pulse of electromagnetic energy, referred to herein as a signal. The antenna 56 narrowly focuses the transmission of the signal pulse. Like the light from a flashlight, this narrow signal illuminates any objects in its path and illuminated objects reflect the electromagnetic energy back to the antenna (reflected power value).

The reflected power value corresponds to that portion of a radar's signal reflected back to the radar by liquids (e.g., rain) and/or frozen droplets (e.g., hail, sleet, and/or snow) residing in a weather object, such as a cloud or storm, or residing in areas proximate to the cloud or storm that is generating the liquids and/or frozen droplets.

The radar controller 50 calculates the distance of the weather object relative to the antenna, based upon the length of time the transmitted signal pulse takes in the transition from the antenna to the object and back to the antenna 56. The relationship between distance and time is linear as the velocity of the signal is constant, approximately the speed of light in a vacuum.

The radar controller 50 calculates a turbulence value that is stored in a three-dimensional buffer within the memory 43.

To get a proper indication of turbulence risk with respect to the planned aircraft route, the three-dimensional distribution of radar-measured turbulence is needed. From this three-dimensional turbulence field, the spatial distribution of resulting risk of turbulence is obtained by including not just the high values measured by the radar, but also areas within some distance (three dimensionally) from the high radar measurement. This distance is based on assumptions on the distance over which the turbulence is assumed to be homogeneous. In one embodiment this distance is roughly 1 to 2 kilometers.

The present invention accesses a three-dimensional distribution of radar-measured turbulence, such as from the IntuVue radar produced by Honeywell International, Inc. If a turbulence hazard exists, a turbulence icon is displayed on a weather display when the cells associated with the turbulence hazard are being manually or automatically selected for display (e.g., along flight plan of aircraft).

Figure 2:
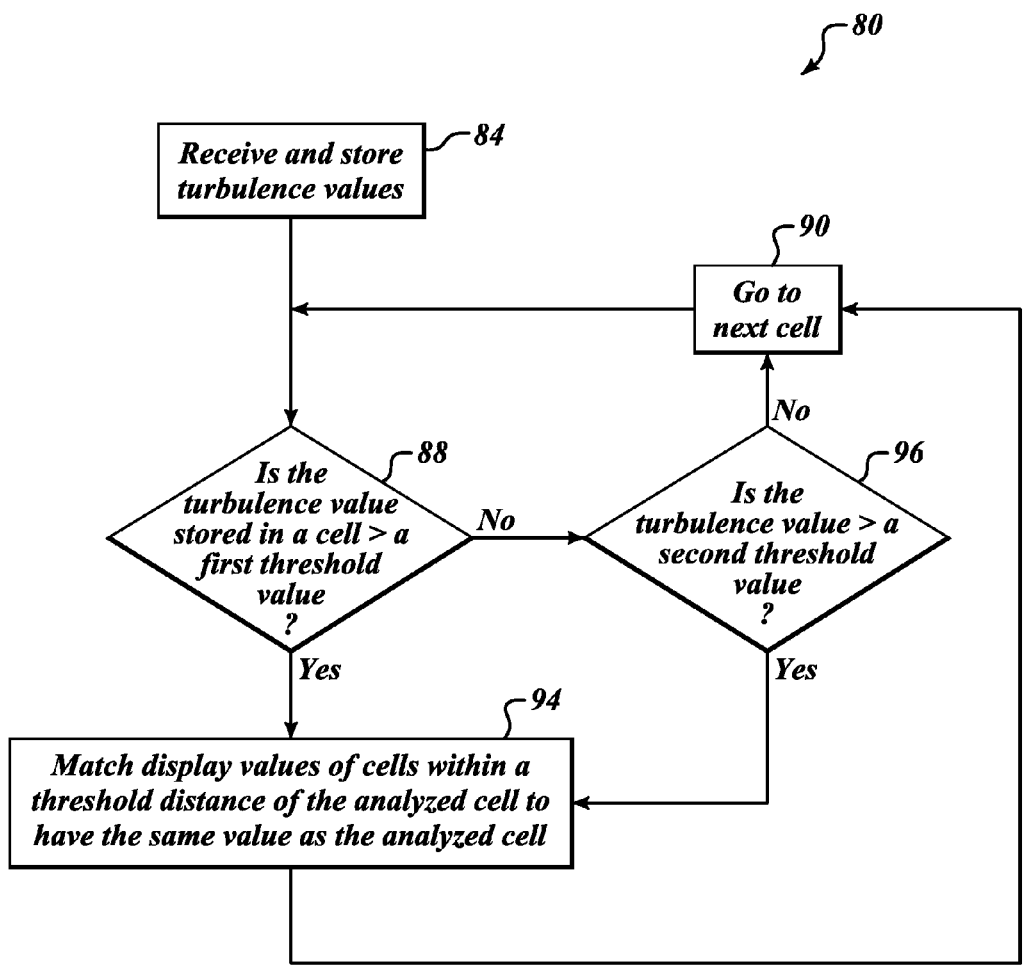
FIG. 2 is a flowchart of an exemplary process performed by the system shown in FIG. 1.

FIG. 2 is a flowchart illustrating an exemplary process 80 performed by the system shown in FIG. 1. First at a block 84, turbulence values are received and optionally stored in/associated with their respective cell in the three-dimensional buffer. At a decision block 88, the process 80 determines whether the stored turbulence value is above a first threshold. In one embodiment, the first threshold is associated with a high risk of turbulence. If the turbulence value is greater than the first threshold value, other cells within a threshold distance of the cell with high-risk turbulence value are assigned a similar high-risk turbulence value (block 94). An image outputted to the weather display shows the cells as high if they are selected for displays. In another embodiment, the other cells include an identifier indicating that they are high-risk, due to proximity to a high-risk cell if they were not previously determined to be high risk.

If, at the decision block 88, the stored turbulence value is not greater than the first threshold value, then, at decision block 96, the stored turbulence value is determined whether it is greater than a second threshold value. In one embodiment, the second threshold value is associated with a medium turbulence risk. If the stored turbulence value is greater than the second turbulence value, then proximate cells are associated and displayed with a medium turbulence indication (icon), see block 94. Then the process 80 proceeds to analyze a next cell, block 90. If the turbulence values are not greater than the first or second thresholds or after the step at the block 94, the process 80 returns to decision block 88 to analyze other cells in the three-dimensional buffer via block 90.

The process 80 can be configured to analyze the turbulence values for any number of different thresholds, thereby allowing for the presentation of any number of different turbulence levels.

Figure 3:
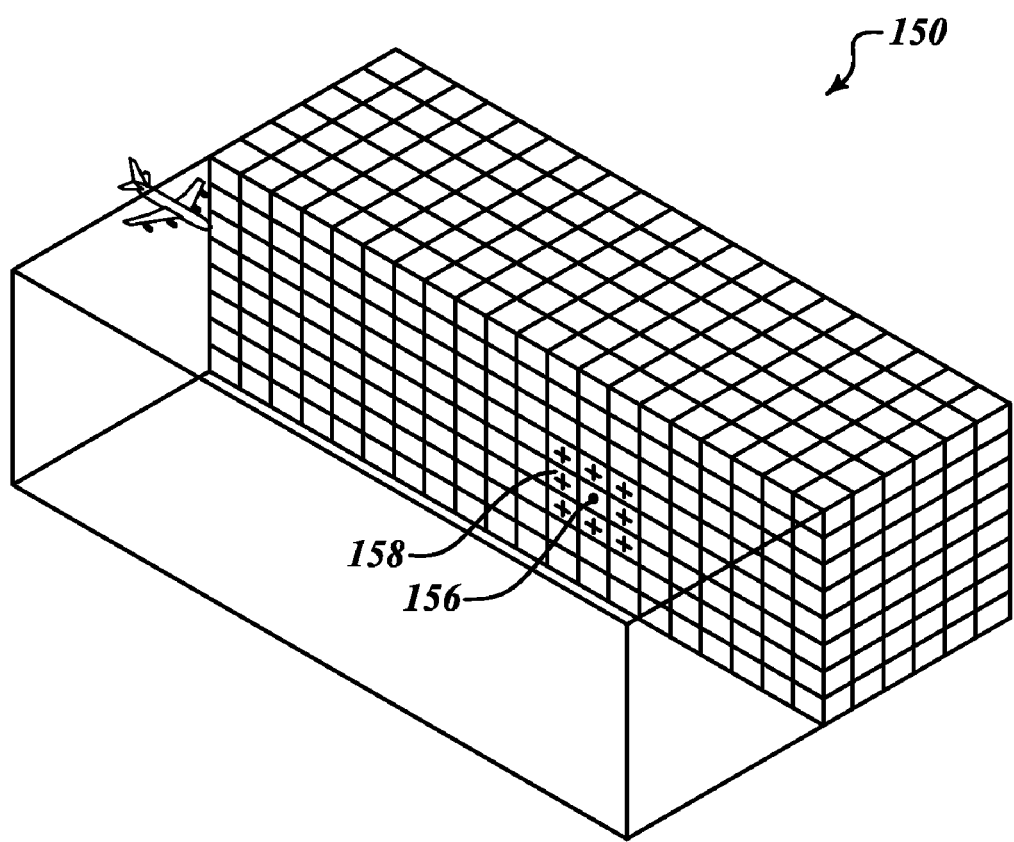
FIG. 3 is a conceptual perspective view of a portion of a three-dimensional buffer used by the system shown in FIG. 1.

FIG. 3 is a conceptual perspective view of a three-dimensional buffer 150. A cell 156 includes a high-risk turbulence value. In this embodiment, the cells 158 that are within the predefined threshold distance from the cell 156 are assigned a high-risk turbulence value because the cell 156 has a high-risk turbulence value. The cells 158 were previously determined to not have a high-risk turbulence value.

Figure 4:
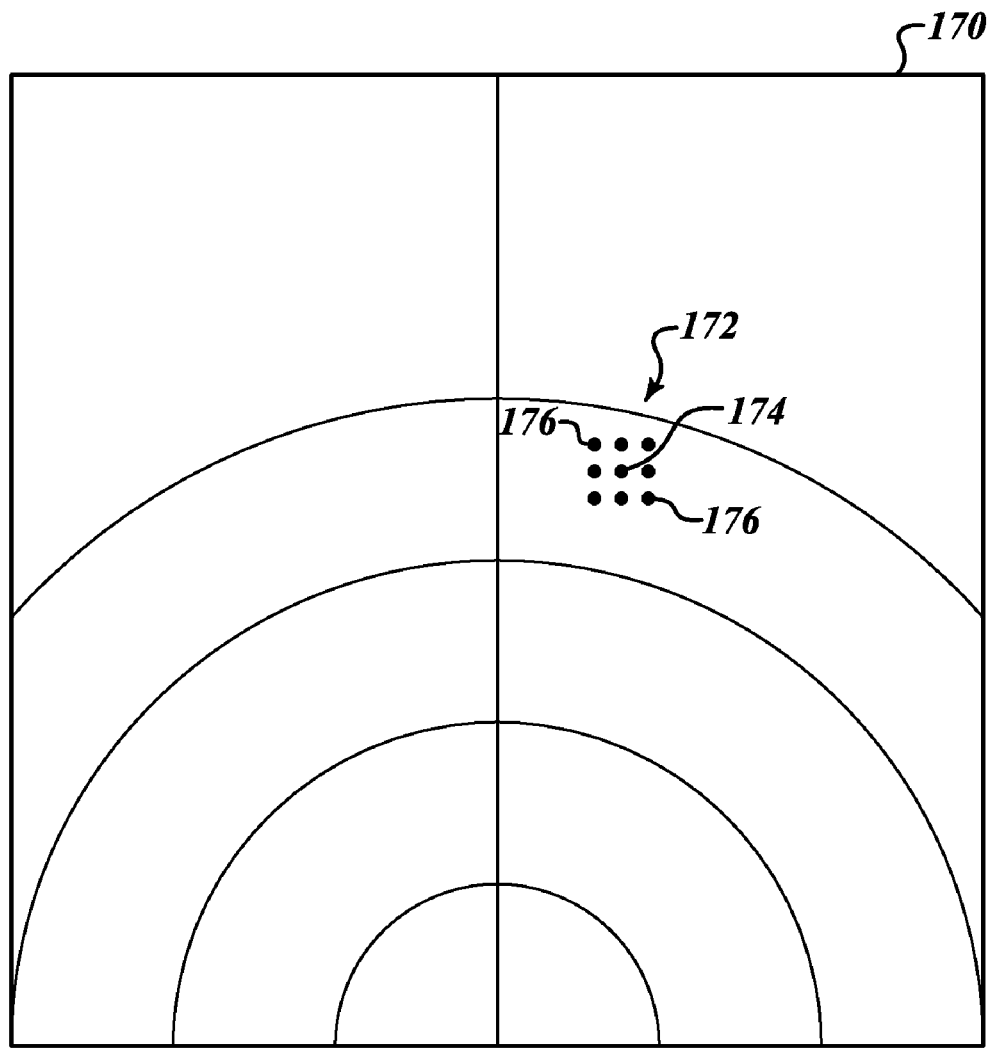
FIG. 4 is an exemplary screen shot of a weather display showing the results of the process of FIG. 2.

FIG. 4 shows a weather display 170 that shows an area 172 of high turbulence. The high-turbulence area 172 includes a first high-turbulence icon 174 because it is associated with a cell in the three-dimensional buffer that was originally determined to have a high-risk turbulence value. The high-turbulence area 172 also includes second high-turbulence icons 176 that are associated with cells in the three-dimensional buffer that have been assigned a high-risk turbulence value based on a threshold proximity to the cell associated with the first high-turbulence icon 174. The cells associated with the second high-turbulence icons 176 were previously determined to not have a high-risk turbulence value.

In one embodiment, the cells proximate to a high- or medium-turbulence cell (primary cell) are displayed in the same color as the primary cell but are slightly transparent. This gives the indication that these cells may be dangerous, but not as dangerous as the primary cell. For example, the primary cell is solid magenta and the proximate cells are transparent magenta.

In another embodiment, the proximity evaluation does not supersede a standard turbulence evaluation. Thus, all the cells may first be evaluated for turbulence level, then those cells with a turbulence level below a threshold are evaluated for proximity to a primary cell (i.e., cell having higher turbulence values). For example, if a cell with a medium-turbulence value is within the threshold proximity to a cell with a high-turbulence value, that cell is upgraded to a high-turbulence value.

In one embodiment, a three-dimensional buffer is not used. A radar system that doesn't include a three-dimensional buffer would still determine turbulence values. Then a determination is made as to whether to enhance display pixels around a pixel having a turbulence value greater than a threshold amount. Some buffering of the turbulence values may be necessary in order to accommodate for the scanning of the radar.

While the preferred embodiment of the invention has been illustrated and described, as noted above, many changes can be made without departing from the spirit and scope of the invention. For example, other flowchart techniques may be used to analyze the turbulence values of the cells. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method comprising:
   automatically receiving turbulence values;
   automatically enhancing one or more pixels on a display that are located within a predefined threshold distance of pixels having a turbulence value that is greater than a first threshold value; and
   automatically storing the received turbulence values into corresponding cells of a three-dimensional buffer,
   wherein automatically enhancing comprises automatically generating and outputting one or more first display icons for cells of the three-dimensional buffer that are located within a predefined threshold distance in the three-dimensional buffer from a cell that has been determined to include a turbulence value that is greater than the first threshold value.

2. The method of claim 1, wherein generating the first display icons is performed when the cells, located within a predefined threshold distance from a cell that has been determined to include a turbulence value that is greater than the first threshold value, have a turbulence value that is below the first threshold value.

3. The method of claim 1, further comprising:
   automatically generating and outputting one or more other display icons for cells that are within a predefined threshold of a cell that has a turbulence value that is greater than one or more other threshold values.

4. The method of claim 3, wherein generating the one or more other display icons is performed when the proximate cells have a turbulence value that is below the one or more other threshold values.

5. The method of claim 3, wherein the one or more other display icons are at least partially similar to a display icon associated with the cell that has been determined to include a turbulence value that is greater than a one or more other threshold value.

6. The method of claim 5, wherein the one or more other display icons are at least partially transparent.

7. The method of claim 1, wherein the first display icons are at least partially similar to a display icon associated with the cell that has been determined to include a turbulence value that is greater than a first threshold value.

8. The method of claim 7, wherein the first display icons are at least partially transparent.

9. A weather radar system comprising:
   a weather radar component;
   a memory comprising a three-dimensional buffer;
   a processor in signal communication with the memory, the processor configured to:
      receive turbulence values from the weather radar component; and
      generate one or more first display icons for locations on a display that are located within a predefined threshold distance another display location having a turbulence value that is greater than a first threshold value; and
   a display in signal communication with the processor, the display configured to output the first display icons.

10. The system of claim 9, wherein the memory comprises a three-dimensional buffer, the processor is further configured to:
   store the received weather radar reflectivity values into the three-dimensional buffer; and
   generate one or more first display icons for cells that are located within a predefined threshold distance from a cell in the three-dimensional buffer that has been determined to include a turbulence value that is greater than a first threshold value, and
   wherein the display is further configured to output the first display icons when associated cells are selected for display from the three-dimensional buffer.

11. The system of claim 10, wherein the first display icons are generated when the proximate cells have a turbulence value that is below the first threshold value.

12. The system of claim 11, wherein the processor is further configured to:

generate and output one or more other display icons for cells that are within a predefined threshold of a cell that has a turbulence value that is greater than one or more other threshold values.

13. The system of claim 12, wherein the one or more other display icons are generated when the proximate cells have a turbulence value that is below the one or more other threshold values.

14. The system of claim 12, wherein the one or more other display icons are at least partially similar to a display icon associated with the cell that has been determined to include a turbulence value that is greater than the one or more other threshold values.

15. The system of claim 14, wherein the one or more other display icons are at least partially transparent.

16. The system of claim 10, wherein the first display icons are at least partially similar to a display icon associated with the cell that has been determined to include a turbulence value that is greater than a first threshold value.

17. The system of claim 16, wherein the first display icons are at least partially transparent.

18. A system comprising:
a means for receiving weather radar reflectivity values from a weather radar system;
a means for storing the received weather radar reflectivity values into a three-dimensional buffer;
a means for generating and storing turbulence values into cells of the three-dimensional buffer based on the stored respective reflectivity values;
a means for generating and outputting first display icons for cells that are within a predefined threshold distance from a cell in the three-dimensional buffer that has been determined to include a turbulence value that is greater than a first threshold value; and
a means for generating and outputting second display icons for cells that are within a predefined threshold from a cell that has a turbulence value that is greater than a second threshold value.

* * * * *